(No Model.)
H. E. SMITH.
MECHANISM FOR TRANSMITTING MOTION.
No. 441,984. Patented Dec. 2, 1890.
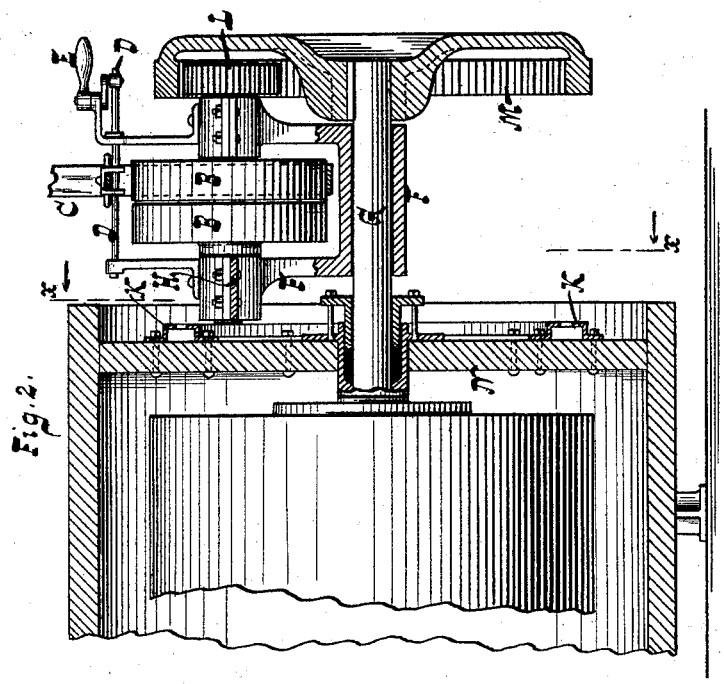
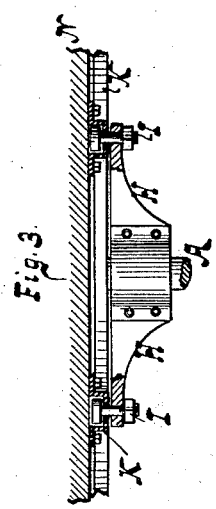
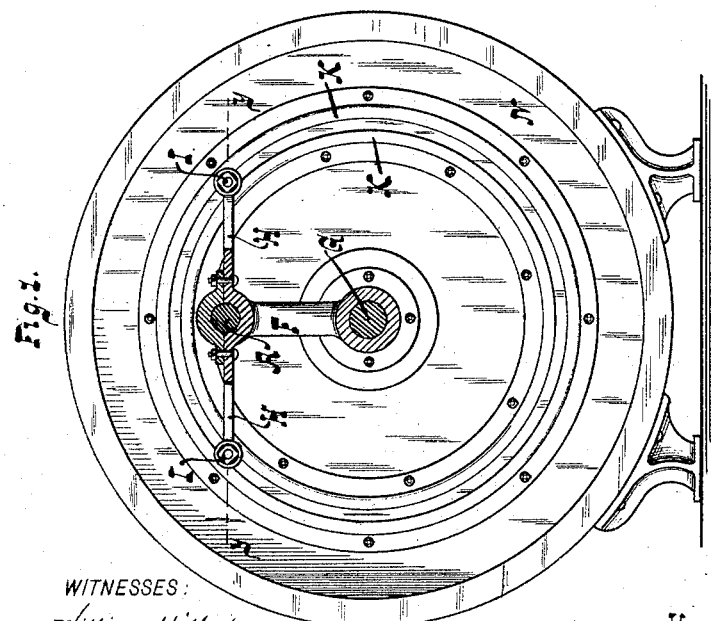
WITNESSES:
William M. Miller
Edward Wolff
INVENTOR:
Hamilton E. Smith.
BY Van Santvoord & Hauff
ATTORNEYS

UNITED STATES PATENT OFFICE.

HAMILTON E. SMITH, OF NEW YORK, N. Y.

MECHANISM FOR TRANSMITTING MOTION.

SPECIFICATION forming part of Letters Patent No. 441,984, dated December 2, 1890.

Application filed July 17, 1890. Serial No. 359,023. (No model.)

*To all whom it may concern:*

Be it known that I, HAMILTON E. SMITH, a citizen of the United States, residing at New York, in the county and State of New York, have invented new and useful Improvements in Mechanism for Transmitting Motion, of which the following is a specification.

This invention relates to a device for transmitting motion; and the invention consists in the details of construction set forth in the following specification and claims and illustrated in the accompanying drawings, in which—

Figure 1 is a side elevation of the device sectioned along $x$ $x$, Fig. 2. Fig. 2 is a longitudinal central section of the device. Fig. 3 is a section along $y$ $y$, Fig. 1.

In the drawings, the letter A indicates a driving-shaft having pulleys B B. The belt C can be shifted from one pulley to another by means of the shifter D, actuated by a lever or handle E. The driving-shaft is supported by the hanger F. This hanger F is mounted on the driven shaft G, so that said hanger can be swung or adjusted about said driven shaft. The hanger F has an arm or arms H, provided with a clamping screw or nut I, engaging a fixed way K. When the screw or screws I are loose, the hanger F can be adjusted about the driven shaft, and when said hanger F is in the proper position the screws I are tightened, so as to fix the hanger F in position. The driving-shaft and driven shaft are connected by gearing L M. The gearing L of the driving-shaft is shown as placed internally to the gearing M of the driven shaft. The outward pull of the belt C tends to draw the hanger into contact with the shaft G, and thus cause wear; but by making the gearing L internal, as shown, a good part of the strain is taken up by said gearing, whereby the shaft G and hanger F are relieved of considerable wear. In other words, the strain of the belt C has a tendency to produce a rapid wear of the journal-boxes of the shaft A, particularly the outside box. The internal gear M produces a strain upon the pinion L in the direction opposite the strain of the belt, whereby the wear of the journal-boxes is reduced. When the belt C comes from above, as shown in the drawings, the hanger, with its pulleys B, is adjusted in an upright position. If the belt C should come from a side or from below, the hanger is adjusted sidewise or downward, so that the pulleys B will always be in position to be squarely grasped by the belt C. The way K may be fixed to a head N, of any desired suitable mechanism, such as the head of the shell of a washing-machine, coffee-roaster, or other device.

What I claim as new, and desire to secure by Letters Patent, is—

1. The combination, with a driven shaft, of a hanger loosely mounted thereon and having arms provided with clamping-screws which engage a fixed way concentric with the driven shaft, and a driving-shaft mounted in said hanger and carrying a pinion meshing an internal gear on the driven shaft, substantially as described.

2. The combination, with a driven shaft, of a driving-shaft, a hanger carrying said driving-shaft and rendered adjustable about the driven shaft, a fixed way within which clamping screws or nuts on the hanger can be adjusted about the driven shaft, and separate or independent pulleys mounted on the driving-shaft, which is provided with a pinion geared internally with the driven gear on the main shaft, substantially as described.

3. The combination, with a driven shaft G, having an internal gear M, of a hanger F, provided with arms H, having clamping-screws I, a fixed way K, with which said clamping-screws engage, and a driving-shaft A, journaled in said hanger and having pulleys B, and provided with a pinion L, meshing with the internal gear M, substantially as described.

In testimony whereof I have hereunto set my hand in the presence of two subscribing witnesses.

HAMILTON E. SMITH.

Witnesses:
J. VAN SANTVOORD,
E. F. KASTENHUBER.